United States Patent
Nguyen et al.

(10) Patent No.: US 10,444,799 B2
(45) Date of Patent: Oct. 15, 2019

(54) NANOTUBE COATED ELECTRONIC DEVICE HOUSING WALL

(71) Applicant: HEWLETT-PACKARD DEVELOPMENT COMPANY, L.P., Houston, TX (US)

(72) Inventors: Bach Lien Nguyen, Houston, TX (US); Hui-Leng Lim, Houston, TX (US); Michael James Pescetto, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 39 days.

(21) Appl. No.: 15/021,590

(22) PCT Filed: Oct. 30, 2013

(86) PCT No.: PCT/US2013/067630
§ 371 (c)(1),
(2) Date: Mar. 11, 2016

(87) PCT Pub. No.: WO2015/065400
PCT Pub. Date: May 7, 2015

(65) Prior Publication Data
US 2016/0231787 A1   Aug. 11, 2016

(51) Int. Cl.
| | |
|---|---|
| *B05D 1/00* | (2006.01) |
| *G06F 1/16* | (2006.01) |
| *G06F 1/20* | (2006.01) |
| *G06F 1/18* | (2006.01) |

(52) U.S. Cl.
CPC ............. *G06F 1/1656* (2013.01); *B05D 1/00* (2013.01); *G06F 1/181* (2013.01); *G06F 1/20* (2013.01); *G06F 1/203* (2013.01); *Y10S 977/932* (2013.01)

(58) Field of Classification Search
CPC ......... B05D 1/00; G06F 1/1656; G06F 1/181; G06F 1/20; G06F 1/203; Y10S 977/932; Y10T 428/30
USPC .......................................................... 428/408
See application file for complete search history.

(56) References Cited

U.S. PATENT DOCUMENTS

| | | | |
|---|---|---|---|
| 4,890,196 A * | 12/1989 | Hinshaw | H01L 23/4093 361/709 |
| 6,616,497 B1 * | 9/2003 | Choi | B82Y 10/00 445/24 |
| 6,934,148 B2 * | 8/2005 | Gorenz, Jr. | H05K 7/20727 165/80.2 |
| 7,168,484 B2 * | 1/2007 | Zhang | B82Y 10/00 165/104.33 |
| 8,194,407 B2 | 6/2012 | Yamaguchi et al. | |

(Continued)

FOREIGN PATENT DOCUMENTS

| | | |
|---|---|---|
| KR | 10-2003-0062116 | 7/2003 |
| KR | 10-2012-0053476 | 5/2012 |

(Continued)

OTHER PUBLICATIONS

KR 20120053476 A translation.*

(Continued)

*Primary Examiner* — Travis M Figg
(74) *Attorney, Agent, or Firm* — HPI Patent Department

(57) ABSTRACT

An electronic device housing comprises a housing wall with a surface and a nanotube coating coated upon the surface of the housing wall.

14 Claims, 5 Drawing Sheets

(56) References Cited

U.S. PATENT DOCUMENTS

| | | | |
|---|---|---|---|
| 2004/0071949 A1* | 4/2004 | Glatkowski | B82Y 10/00 428/313.3 |
| 2005/0142317 A1* | 6/2005 | Clovesko | B32B 9/00 428/40.1 |
| 2006/0233692 A1* | 10/2006 | Scaringe | B82Y 30/00 423/335 |
| 2006/0257624 A1* | 11/2006 | Naritomi | B29C 45/14311 428/141 |
| 2007/0155136 A1* | 7/2007 | Chrysler | H01L 23/373 438/478 |
| 2008/0044651 A1* | 2/2008 | Douglas | B82Y 10/00 428/339 |
| 2008/0170982 A1* | 7/2008 | Zhang | B82Y 10/00 423/447.3 |
| 2009/0059535 A1* | 3/2009 | Kim | H05K 7/20427 361/710 |
| 2009/0068387 A1* | 3/2009 | Panzer | B32B 37/02 428/40.1 |
| 2010/0033933 A1* | 2/2010 | Hashimoto | H05K 7/208 361/700 |
| 2010/0124025 A1* | 5/2010 | Yamaguchi | H01L 23/373 361/708 |
| 2011/0211313 A1* | 9/2011 | Ward | H01L 23/373 361/704 |
| 2011/0310553 A1* | 12/2011 | Hsiao | G06F 1/1616 361/679.55 |
| 2012/0231270 A1 | 9/2012 | Dhinojwala et al. | |
| 2012/0298345 A1* | 11/2012 | Hyeon | C08F 230/08 165/185 |
| 2012/0299175 A1* | 11/2012 | Tran | B82Y 10/00 257/712 |
| 2013/0163205 A1 | 6/2013 | Zhang et al. | |
| 2013/0236753 A1* | 9/2013 | Yue | H01M 2/1077 429/62 |

FOREIGN PATENT DOCUMENTS

| | | | | |
|---|---|---|---|---|
| KR | 20120053476 A | * | 5/2012 | H01M 2/1077 |
| KR | 20120053476 A | * | 5/2012 | H01M 2/1077 |
| KR | 10-1253266 | | 4/2013 | |
| WO | WO-2012067432 A2 | * | 5/2012 | H01M 2/1077 |

OTHER PUBLICATIONS

KR-20120053476-A Machine Translation.*
Definition of Planarize.*
Xu, et al.; "Nanoengineering Heat Transfer Performance at Carbon Nanotube Interfaces", < http://pubs.acs.org/doi/abs/10.1021/nn9006237 >, Aug. 24, 2009.

* cited by examiner

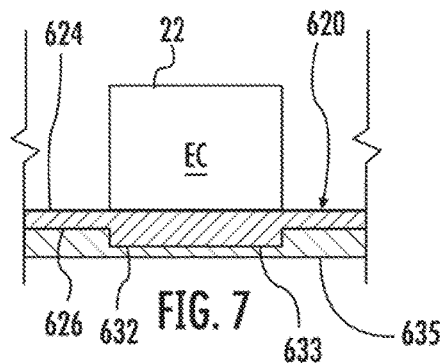
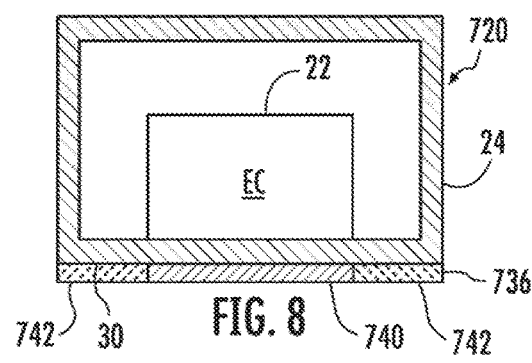
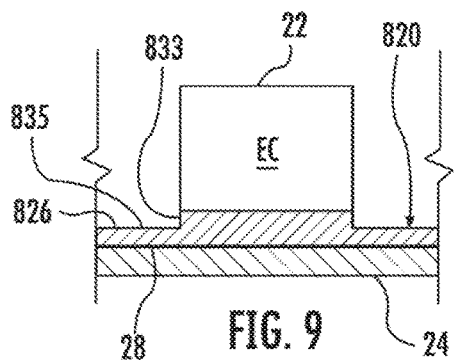
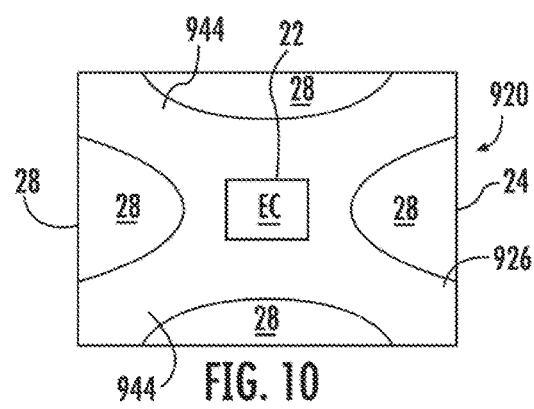
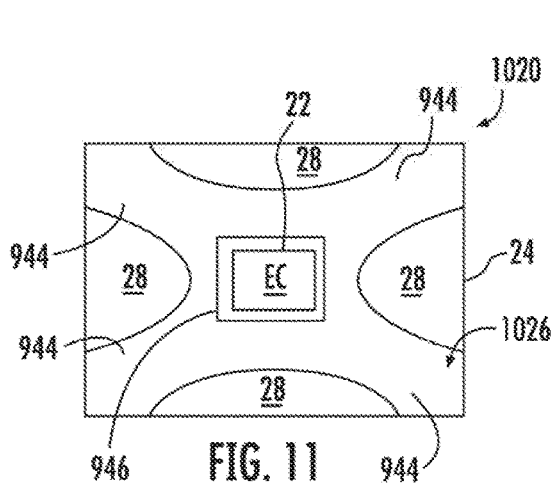
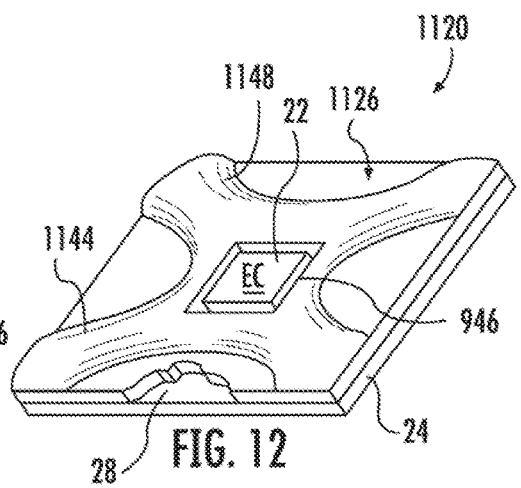

NANOTUBE COATED ELECTRONIC DEVICE HOUSING WALL

BACKGROUND

Electronic devices generate heat due to inherent electrical resistance within their electronics. Such heat, if not sufficiently dissipated, may damage the electronics. Existing methods for dissipating such heat are costly, difficult to employ and occupy valuable space, increasing the size of the electronic device.

BRIEF DESCRIPTION OF THE DRAWINGS

FIG. 7 is a fragmentary sectional view of another example implementation of the housing of FIG. 1.

FIG. 8 is a sectional view of another example implementation of the electronic device housing of FIG. 1.

FIG. 9 is a fragmentary sectional view of another example Implementation of the housing of FIG. 1.

FIG. 10 is a top view of another example implementation of electronic device housing of FIG. 1.

FIG. 11 is a top view of another example implementation of electronic device housing of FIG. 1.

FIG. 12 is a perspective view of another example implementation of electronic device housing of FIG. 1.

DETAILED DESCRIPTION OF THE EXAMPLE EMBODIMENTS

Figure 1:
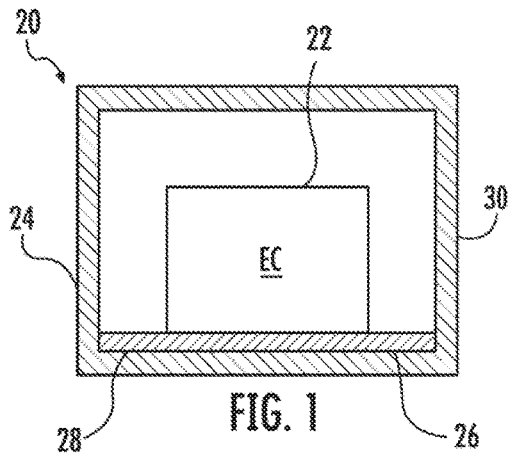
FIG. 1 is a sectional view of an example electronic device housing illustrated with a schematically illustrated electronic component.

FIG. 1 illustrates an electronic device housing 20 for enclosing, carrying our supporting an electronic component 22 (schematically shown) of an electronic device. As will be described hereafter, housing 20 comprises a nanotube coating coated upon existing structures or surfaces of the housing with minimal, if any, additional parts or enlargement of housing 20. The nanotube coating provides enhanced or additional heat dissipation while maintaining the size, cost, aesthetics and simplicity of the electronic device.

Electronic device housing 20 comprises housing wall 24 and nanotube coating 26. Housing wall 24 encloses, surrounds, supports or carries electronic component 22. Housing wall 24 serves the function of supporting electronic component 22 and/or enclosing electronic component 22. In the example illustrated, housing wall encloses electronic component 22, having an inner surface 28 and an outer surface 30. Although illustrated as being rectangular, housing wall 24 may have a variety of sizes, shapes and configurations. In one implementation, housing wall 24 is formed from one or more materials having a relatively high level of thermal conductivity, such as from one or more metals such as copper, aluminum, steel or various other metals or metal alloys. In yet other implementations, housing wall 24 may be formed from one or more polymeric or ceramic materials.

Nanotube coating 26 comprises a nanotube layer, such as a film of carbon nanotubes or a carbon nanotube array, coated upon a surface of housing wall 24 so as to form an outermost layer upon the particular surface. Nanotube coating 26 exhibits relatively high thermal conductance, a single walled nanotube having a room temperature thermal conductivity along its axis of shout 3500 W·m−1·K−1;[65] as compared to copper, a metal well known for its good thermal conductivity, which transmits 385 W·m−1·K−1. It is believed that carbon nanotubes 26 have the relatively high thermal conductivity due to a large phonon mean free path in strong carbon $sp^2$ bond network of the walls of the carbon nanotubes. In the example illustrated, nanotube coating 28 is coated upon surface 28, forming an outermost layer upon surface 28. In the example illustrated, nanotube coating 26 interfaces between housing wall 24 and electronic component 22 to thermally conductive heat within housing 30 and from electronic component 22 to housing wall 24 for thermal dissipation to the surrounding ambient environment. Although enlarged relative to housing wall 24 and electronic component 22 for purposes of illustration, nanotube coating 26 is thin relative to the thickness of the portion of housing wall 24 upon which nanotube costing 26 is deposited, adding de minimus weight, de minimus thickness and de minimis physical weight-bearing support or physical integrity to housing wall 24 or electronic component 22. In the example illustrated, nanotube coating 26 comprises an applied coating which forms a film, the coating having a thickness of less than or equal to 0.040 mm. As a result, nanotube coating 26 is applied to pre-existing structures of an electronic device, such as housing wall 124 without requiring additional parts, panels, screens of the like for carrying the coating and without enlarging the size of housing 24 or the electronic device comprising housing 24.

In one implementation, nanotube coating 28 is comprised of single walled nanotubes formed from carbon, such as graphene. In yet other implementations, nanotube coating 28 is comprised of single or multi-walled carbon nanotubes formed from graphene or other materials. In one implementation, nanotube coating 26 is applied so as to control the orientation or axis of the nanotubes, wherein thermal conductivity is greater along such axes as compared to thermal conductivity in directions transverse to such axes. In such a manner, the steering of heat is also controlled by selectively orienting the axes of the nanotubes of nanotube costing 26. In yet other implementations, nanotube coating 26 comprises a coating or film of randomly oriented carbon nanotubes.

Figure 2:
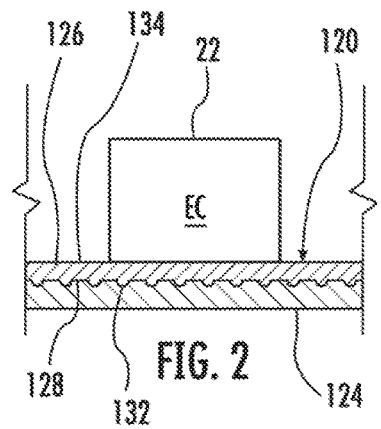
FIG. 2 is a fragmentary sectional view of another example implementation of the housing of FIG. 1.

FIG. 2 is a fragmentary sectional view illustrating electronic device housing 120, an example implementation of housing 20, for use with electronic component 22 (schematically shown). Electronic device housing 120 comprises housing wall 124 and nanotube coating 128. Housing walls 124 is similar to housing wall 24 except that housing walls 124 is specifically illustrated as comprising a porous inner surface 128 having pores 132.

Nanotube costing 126 comprise a coating layer coated upon inner surface 128. In one implementation, coating 128 has a thickness of less than or equal to 0.040 mm. In the example illustrated, coating 126 is coated upon inner surface 128 while at a viscosity so as to flow into and fill pores 132. Upon solidifying, through curing or evaporation, costing 126 provides a new outermost layer upon surface 128 which has a new outermost surface 134 for the interior of housing wall 124, wherein the surface 134 is smoother and more finished as compared to surface 128. At the same time, because coating 134 fills pores 132, the thermally insulative effect of air filled pores is reduced and thermal dissipation is increased.

Figure 3:
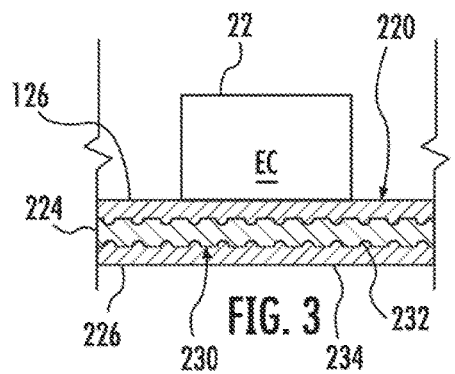
FIG. 3 is a fragmentary sectional view of another example implementation of the housing of FIG. 1.

FIG. 3 is a fragmentary sectional view illustrating electronic device housing 220, an example implementation of housing 20, for use with electronic component 22 (schematically shown). Electronic device housing 220 comprises housing wall 224 and nanotube coatings 126, 225. Housing wall 224 is similar to housing wall 124 except that housing walls 124 is specifically illustrated as comprising a dimpled or porous outer surface 230 having dimples or pores 232.

As with electronic device housing 120, nanotube coating 126 coated upon inner surface 128 while at a viscosity so as to flow into and fill pores 132. Upon solidifying, through curing or evaporation, coating 128 provides a new outermost layer upon surface 128 which has a new outermost surface 134 for the interior of housing wall 224, wherein the surface 134 is smoother and more finished as compared to surface 128. At the same time, because coating 234 fills pores 232, the thermally insulative effect of open air filled pores is reduced and thermal dissipation is increased.

Nanotube coating 226 is similar to nanotube coating 126 except the nanotube coating 226 is formed on the exterior surface 230 rather than the interior surface 128. Like coating 126, coating 228 is coated upon an exterior surface 230 while at a viscosity so as to flow into and fill pores 234. Upon solidifying, through curing or evaporation, coating 226 provides a new outermost layer upon surface 230 which has a new outermost surface 234 for the exterior of housing wall 124, wherein the surface 234 is smoother and more finished as compared to surface to 30. At the same time, because coating 226 fills pores 232, the thermally insulative effect of air filled pores is reduced and thermal dissipation increased. In addition, coating 226 provides a smooth finished look to housing wall 224, allowing housing wall 224 to the unfinished, rough or unpolished when used in electronic device.

Although housing wall 224 is illustrated as being sandwiched between nanotube coatings 126, 226, in other implementations, nanotube coating 126 may be omitted. In such an implementation, the electronic upon 22 a rest against inner surface 128 of housing wall 224. In some implementations, inner surface 128 of housing wall 224 maybe Brown, six smooth and otherwise finished without the addition of nanotube coating 126 or prior to being coated with nanotube coating 126. Likewise, in some implementations, surface 230 may be ground, polished or otherwise finished prior to being coated with nanotube coating 226.

Figure 4:
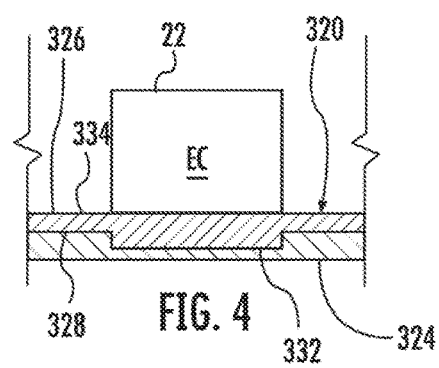
FIG. 4 is a fragmentary sectional view of another example implementation of the housing of FIG. 1.

FIG. 4 is a fragmentary sectional view illustrating electronic device housing 320, another implementation of electronic device housing 20, for housing or supporting electronic component 22 (schematically shown). Housing 320 comprises housing wall 324 and nanotube coating 328. Housing wall 324 is similar to housing wall 24 except that housing wall 324 is specifically illustrated as comprising inner surface 328 in lieu of surface 28. Surface 328 faces electronic component 22 and comprises a depression, recess or cavity 332. In one implementation, cavity 332 has at least one dimension equal to our larger than a corresponding dimension of electronic component 22. Although illustrated as having a rectangular cross-section, cavity 332 may have other configurations. Although illustrated as including a single cavity 332, surface 328 may include multiple spaced cavities proximate to electronic component 22 and/or remote from electronic component 22.

Nanotube coating 326 is similar to nanotube coating 26 except that nanotube coating 326 fills cavity 332 and extends completely across and beyond cavity 332. In one implementation, coating 326 provides a smooth innermost surface 334 that is substantially level, lacking dips, edges or depressions corresponding to the edges of cavity 332 to conceal cavity 332.

During forming of housing 320, nanotube coating 326 is applied while in a sufficiently liquid, flowable, spreadable or low viscous state so as to flow into or be spread into cavity 332 to fill cavity 332 and form the smooth inner surface 334. Upon solidification, either after curing or evaporation, nanotube coating 326 forms a film which interfaces between housing wall 324 and electronic component 22. Because nanotube coating 326 fills cavity 332, the portion of nanotube coating 326 within cavity 332 and also to electronic component 22 has a greater thickness as compared to those portions of coating 326 about cavity 332 to provide enhanced or additional thermal dissipation in regions adjacent to electronic component 22. In addition, cavity 332 mates and interlocks with the solidified costing 326 (a film) to Inhibit movement of coating 326 relative to or separation from surface 328.

Figure 5:
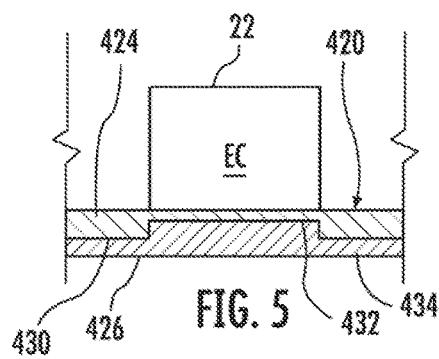
FIG. 5 is a fragmentary sectional view of another example implementation of the housing of FIG. 1.

FIG. 5 is a fragmentary sectional view illustrating electronic device housing 420, another implementation of electronic device housing 20, for housing or supporting electronic component 22 (schematically shown). Housing 420 comprises housing wall 424 and nanotube coating 426. Housing wall 424 is similar to housing wall 24 except that housing wall 424 is specifically illustrated as comprising exterior surface 430 in lieu of surface 30. Surface 430 faces away from electronic component 22 and comprises a depression, recess or cavity 432. In one implementation, cavity 432 has at least one dimension equal to our larger than a corresponding dimension of electronic component 22. Although illustrated as having a rectangular cross-section, cavity 432 may have other configurations. Although illustrated as including a single cavity 432, surface 430 may include multiple spaced cavities proximate to electronic component 22 and/or remote from electronic component 22.

Nanotube coating 428 is similar to nanotube coating 26 except that nanotube coating 426 fills cavity 432 and extends completely across and beyond cavity 432. In one implementation, coating 428 provides a smooth outermost surface 434 that is substantially level, lacking dips, edges or depressions corresponding to the edges of cavity 432 to conceal cavity 432.

During forming of housing 420, nanotube coating 426 is applied while in a sufficiently liquid, flowable, spreadable or low viscous state so as to flow into or be spread into cavity 432 to fill cavity 432 and form the smooth inner surface 434. Upon solidification, either after curing or evaporation, nanotube coating 426 forms a film which interfaces between housing wall 424 and electronic component 22. Because nanotube coating 426 fills cavity 432, the portion of nanotube coating 426 within cavity 432 and opposite to electronic component 22 has a greater thickness as compared to those portions of coating 426 about cavity 432 to provide enhanced or additional thermal dissipation in regions adjacent to electronic component 22. In addition, cavity 432 mates and interlocks with the solidified coating 426 (a film) to inhibit movement of coating 426 relative to or separation from surface 430.

In each of electronic device housings 320 and 420 shown in FIGS. 4 and 5, respectively, the housing walls 324 and 424 have non-uniform thicknesses to accommodate and form nanotube coatings 326, 426 having greater thicknesses in regions opposite to electronic component 22 to enhance thermal dissipation from electronic component 22. In some implementations, electronic component 22 may have sufficiently high heat intensity so as to result in hotspot forming contact regions on the exterior surface of housing 320, 420 where portions of the housing 320, 420 may come into contact with a person. For example, in some implementations, electronic component 22 comprises a video controller, such as a video graphics application (VGA) controller, for a display device having sufficient heat intensity to hotspot contact temperatures uncomfortable to touch of a person. In such circumstances, direct thermal transfer from electronic component 22 to housings 324, 424 opposite to electronic component 22 may be reduced by alternatively utilizing housing walls 324, 424 having a non-uniform thickness to accommodate a form nanotube coating 326, 426 having reduced, rather man increased thicknesses in regions opposite to electronic component 22. As a result, nanotube coatings provide relatively lower thermal transfer from electronic component 22 in regions directly adjacent to electronic component 22 so as to avoid a "hotspot" on housings 320, 420 which might be uncomfortable to touch of a user.

Figure 6:
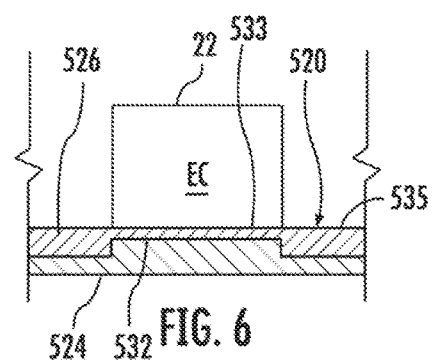
FIG. 6 is a fragmentary sectional view of another example implementation of the housing of FIG. 1.

FIGS. 6 and 7 illustrate electronic device housings 520 and 620, respectively. Housings 520 and 620 are similar to housings 320 and 420, respectively, except that instead of housing walls 324, 424 having interior facing and exterior facing cavities 332, 432 in regions opposite to electronic component 22 to accommodate thicker regions of nanotube coatings 328, 428, respectively, housings 520 and 620 comprise interior upwardly facing and exterior downwardly facing raised portions, platforms or plateaus 532 and 632, respectively, proximate to electronic component 22. Housings 520, 628 also include nanotube coatings 526 and 626, respectively, which as a result of being coated, have thinner regions 533, 633 on such plateaus 532, 632 in regions proximate to electronic component 22 as compared to other regions 535, 635 surrounding plateaus 532, 632. Consequently, thermal transfer or thermal conductance is relatively lower in regions directly opposite to electronic component 22 to reduce the likelihood of the formation of hotspot contact regions which may be uncomfortable to touch of a person.

FIG. 8 is a sectional view illustrating electronic device housing 720, another example implementation of electronic device housing 20. Electronic device housing 720 comprises housing wall 24 (described above) housing, supporting, contacting and/or enclosing an electronic component 22 (schematically shown) and nanotube coating 726. Nanotube coating 726 is formed upon exterior surface 30 of housing wall 24. In one implementation, nanotube coating 726 is similar to nanotube coating 226 (described above with respect to FIG. 3) in that nanotube coating 726 fills dimples, voids, depressions, or pores in the exterior surface of housing wall 24.

Nanotube costing 726 comprises differently colored portions 740, 742. Portion 740, 742 have different colors. For purposes of this disclosure, different colors encompasses different shades, hues and the like. In one implementation, portion 740 has a different shade of gray or black as compared to portions 742. In some implementations, portions 740, 742 may foe patterned upon surface 30 to provide an ornamental design, graphic or text. Although nanotube coating 726 is illustrated as comprising two distinctly colored portions, nanotube coating 726 may alternatively comprise greater than two differently colored portions and such color portions may be continuous or may be spaced from one another along an exterior surface 30 of housing wall 24.

FIG. 9 is a fragmentary sectional view illustrating electronic device housing 820, another example implementation of electronic device housing 20, supporting or enclosing electronic component 22. Electronic device housing 820 is similar to electronic device housing 20 except that electronic device housing 820 comprises nanotube coating 826 in lieu of nanotube coating 26. As shown by FIG. 9, nanotube coating 826 having non-uniform thickness over and on portions of housing wall 24 having a uniform thickness. In the example illustrated, nanotube coating 826 comprises a portion 833 of increased thickness, relative to other portions 835, in regions proximate electronic component 22. As a result, thickened portion 833 provides enhanced or additional thermal transfer thermal conductivity properties in regions closest to electronic component 22 to receive and transfer heat away from electronic component 22.

In one implementation, thickened portion 833 has at least one dimension equal to or larger than a corresponding dimension of electronic component 22. Although illustrated as having a rectangular cross-section, thickened portion 833 may have other configurations. Although illustrated as including a single cavity thickened portion 833, nanotube coating 835 may include multiple spaced cavities proximate to electronic component 22 and/or remote from electronic component 22.

In one implementation, nanotube coating 826 is formed upon interior surface 28 of housing wall 24 through selective patterning of coating 826 to form the non-uniform thickness of coating 826. In one implementation, a first base layer of nanotube costing 826 is initially coated to form a uniform layer forming portions 835. After solidification of the first base layer, a second supplemental coating is selectively applied over the first base layer to form thickened portion 833. In one implementation, the selective application may be achieved utilizing masking, spraying a fluid or liquid nanotube material through a mask. In one implementation, selected application may be achieved through the use of inkjet printing or stamp printing. In still other implementations, nanotube coating 826 may be formed by applying a uniform thickness layer upon surface 28 and subsequently selectively removing portions of the layer to form the thinner portions 835.

FIG. 10 is a top view illustrating electronic device housing 920, another example implementation of housing 20, for enclosing and/or supporting electronic component 22. Housing 920 is similar to housing 20 except that housing 920 comprises nanotube coating 926 instead of coating 26. Those remaining components or elements of housing 920 which correspond to housing 20 are numbered similarly.

Nanotube coating 926 is similar to nanotube coating 26 except that nanotube coating 928 is selectively patterned upon interior surface 28 of housing wall 24. In example illustrated, nanotube coating 926 is selectively patterned so as to steer heat away from electronic component 22 towards corners of housing wall 24 at a greater flow rate as compared to other portions of housing wall 24. In the example illustrated, nanotube coating 928 underlies electronic component 22 between electronic pointed 22 and surface 28 of housing wall 24 and comprises outwardly extending branches, wings, fingers extensions 944 outwardly emanating from electronic component 22 to the generally cooler corners of housing wall 24 for heat dissipation.

In one implementation, the selective application may be achieved utilizing masking, spraying a fluid or liquid nanotube material through a mask. In one implementation, selected application may be achieved through the use of inkjet printing or stamp printing. In still other implementations, nanotube coating 926 may be formed by applying a uniform thickness layer upon surface 28 and subsequently selectively removing portions of the layer to form extensions 944.

FIG. 11 is a top view illustrating electronic device housing 1020, another example implementation of electronic device 20. Electronic device housing 1020 is similar to electronic device housing 920 except that electronic device housing 1020 comprises nanotube coating 1026 in lieu of nanotube coating 926. Nanotube coating 1026 is itself similar to nanotube coating 926 except the nanotube coating 1026 is thermally disconnected from electronic component 22. The term "thermally disconnected" means that nanotube coating 1026 is either thermally Isolated from electronic component 22 or may receive heat from electronic component 22 through other intermediate layers are structures, but at a lower transfer rate as compared to if nanotube coating 1026 was in direct contact with electronic component 22. In the example illustrated, nanotube coating 1028 has an aperture 946 receiving electronic component 22 to spatially isolate or separate nanotube coating 1026 from electronic component 22. In other implementations, nanotube coating 1026 may contact sides of electronic component 22, but does not extend directly between electronic component 22 and surface 28 of housing wall 24 so as to be sandwiched between surface 28 and electronic component 22. As a result, direct thermal transfer in a direction perpendicular to surface 28 to the exterior of housing wall 24 is reduced or slowed to inhibit the formation of a "hotspot" which may be uncomfortable to touch of a user.

FIG. 12 is a perspective view (with a portion broken away for purposes of illustration) illustrating electronic device housing 1120, another example implementation of electronic device housing 20. Electronic device housing 1120 is similar to electronic device housing 1020 except that electronic device housing 1120 comprises nanotube coating 1126 in lieu of nanotube coating 1026. Nanotube coating 1126 is similar to nanotube coating 1026 except that nanotube coating 1126 continues to extend across surface 28 of housing wall 24, but includes thicker regions or portions 1148 (having an exaggerated greater thickness for purposes of illustration) which are patterned to form extensions 1144. Extensions 1144 are similar to extensions 944 in that extensions 1144 emanate outwardly from electronic component 22 to cooler corners of housing wall 24 for steering and transmitting heat at a greater rate to such corners as compared to other portions of coating 1126. In the example illustrated, nanotube coating 1126 is illustrated as including aperture 946 to reduce a likelihood of the formation of a contact "hotspot" as discussed above. In other implementations, coating 1126 may contact electronic component 22 along the side edges of electronic component 22 or may additionally or alternatively extend beneath and between electronic component 22 and surface 28 of housing wall 24.

Figure 13:
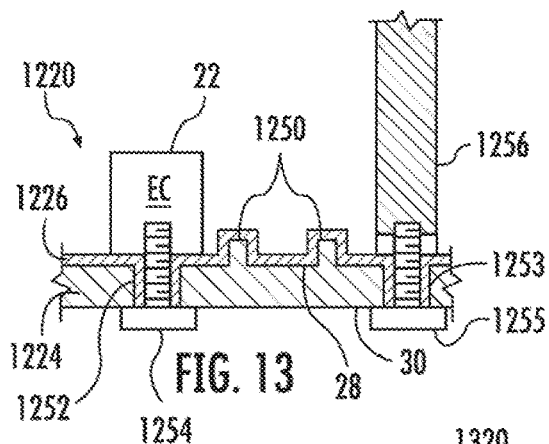
FIG. 13 is a fragmentary sectional view of another example implementation of electronic device housing of FIG. 1.

FIG. 13 is a fragmentary sectional view illustrating electronic device housing 1220, another example implementation of electronic device housing 20. Electronic device housing 1220 comprises housing wall 1224 and nanotube coating 1226. Housing wall 1224 is similar to housing wall 24 except that inner surface 28 of housing wall 1224 is illustrated as additionally comprising ribs 1250 and that housing wall 1224 further comprises apertures 1252, 1253 through wall 1224. Ribs 1250 protrude into an interior of housing 1220 and serve to provide structural strength and/or supporter space internal structures or electronic components within housing 1220. Apertures 1252, 1253 extend through housing wall 1224. In one implementation, apertures 1252, 1253 provide inspection or venting openings. In yet another implementation, apertures 1252, 253 comprise fastener apertures through which fasteners, such as bolts, rivets, screws, clips and the like may extend for connecting or fastening other structures to either the interior or exterior of housing 1220. In the example illustrated, aperture 1252 receives fastener 1254 which connects to electronic component 22 while fastener 1253 receives fastener 1255 which the connected to an additional structure or wall 1256. In other implementations, apertures 1252, 1253 may have other configurations.

Nanotube coating 1228 is coated upon interior surface 28 so as to extend over and encapsulate ribs 1250, following the contour of ribs 12502 increase the overall surface area for heat dissipation. Nanotube coating 1226 is further coated upon the interior surfaces of apertures 1252, 1253 to serve as an enhanced or additional thermal interface between housing wall 1224 and fasteners 1254 and 1255. In implementations where fasteners 1254 or 1255 may not be present within apertures 1252, 1253, respectively, coating 1226 provides an enlarged surface area for dissipating heat into the void of such apertures 1252, 1253.

Figure 14:
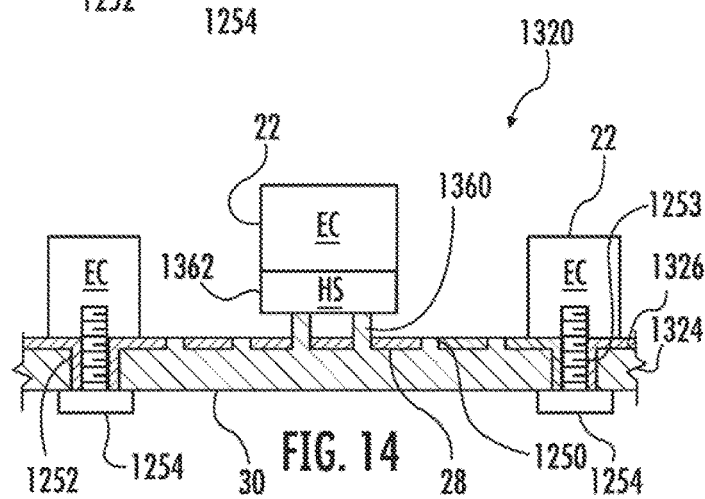
FIG. 14 is a fragmentary sectional view of another example implementation of electronic device housing of FIG. 1.

FIG. 14 is a fragmentary sectional view illustrating electronic device housing 1320, another example implementation of electronic device housing 20. Electronic device housing 1320 comprises housing wall 1324 and nanotube coating 1328. Housing wall 1324 is similar to housing wall 1224 except that surface 28 of housing wall 1324 additionally comprises standoffs 1360. Standoffs 1360 comprise posts, columns or other projections extending from the remainder of surface 28 above ribs 1250 to elevate and/or support electronic components, such as processors, circuits and heat sinks. In the example illustrated, standoffs 1350 elevate and support electronic component 22 having a hotspot 1362. In other implementations, standoffs 1360 may support other structures and may have other arrangements.

Nanotube coating 1326 is similar to nanotube coating 1226 except that nanotube coating 1326 exposes ribs 1250 and standoffs 1360 such that ribs 1250 and standoffs 1360 extend flush to or project beyond the outermost layer surface of nanotube coating 1326. In one implementation, nanotube coating 1326 is selectively coated does not cover portions of ribs 1250 and standoffs 1360. In yet another implementation, portions of nanotube coating 1326 extending upon ribs 1250 and standoffs 1360 are removed through etching or other material removal techniques. Because nanotube coating 1326 is omitted where housing wall 1324 supports electronic component 22 with its hotspot 1362, the likelihood of a hotspot forming on a surface of housing wall 1324 which may be uncomfortable to touch of a user is reduced. At the same time, heat may be dissipated along housing wall 1324. In some implementations, nanotube coating 1326 may be patterned in a fashion similar to the patterning of nanotube coating 928 or 1026 to steer heat at a faster rate towards corners of housing wall 1324 as compared to other portions of housing wall 1324.

Figure 15:
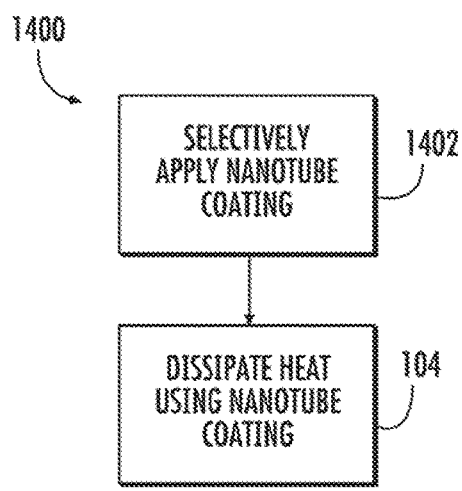
FIG. 15 is a flow diagram of an example method for forming and utilizing the electronic device housing of any of FIGS. 1-14.

FIG. 15 is a flow diagram illustrating an example method 1400 for use with electronic devices having a heat generating electronic component support her house within an electronic device housing wall. As indicated by step 1402, nanotube coating 26, 126, 226, 326, 426, 526, 626, 726; 826, 926, 1026, 1126, 1226, 1326 are selectively applied or coated upon the surface of a housing wall so as to form be outermost layer upon the surface. In one implementation, such patterning may result in the nanotube coating having a non-uniform thickness and selected regions. In another implementation, the patterning may result in the nanotube coating covering selected portions of the housing wall. In one implementation, the patterning is such that heat is steered to specific predefined portions of the housing wall, such as corners of the housing wall which may be at a lower temperature.

Figure 16:
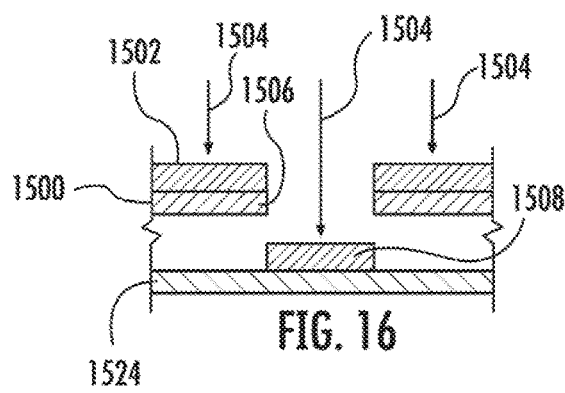
FIG. 16 is a fragmentary sectional view illustrating m example method for selectively applying a nanotube coating to an electronic device housing wall.

FIG. 16 illustrates one example method for selectively applying the nanotube coating per step 1402. As shown by FIG. 16, a mask structure 1500 positioned above the electronic device support wall 1524. Nanotube coating material 1502 is applied from an opposite side of masking structure 1500 as wall 1524. In one implementation, the nanotube coating material 1502 in a liquid, granular or powder form is directed in the direction indicated by arrows 1504 through aperture 1506 within masking structure 1500 so as to form nanotube coating 1508 upon the surface of housing wall 1524. In other implementations, the material which forms nanotube coating 1508 may be selectively applied or applied and selectively removed in other fashions.

As indicated by step 1404, heat generated by resistive elements or other structures of electronic opponent 22 is transmitted to or dissipated by the selectively patterned nanotube coating 1508. By distributing and dissipating heat across a larger surface area or by selectively steering the heat to cooler portions of the electronic device housing, potential damage to electronic components from such heat is reduced.

Figure 17:
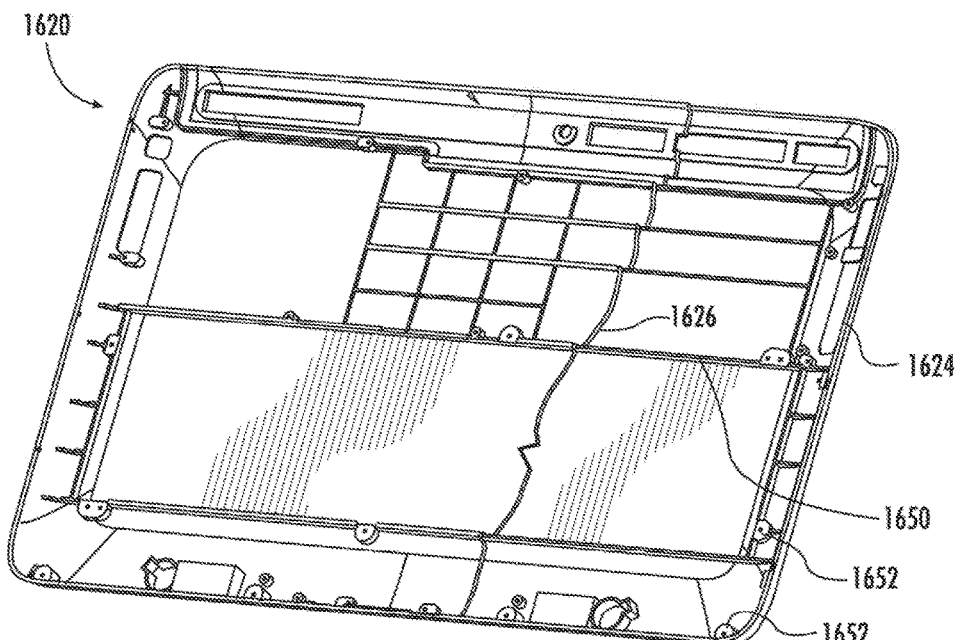
FIG. 17 is a perspective view of another example implementation of electronic device housing of FIG. 1.

FIG. 17 is a perspective view illustrating an example electronic device housing 1620, another implementation of electronic device housing 20. Electronic device housing comprises housing wall 1624 and nanotube coating 1626 (shown partially broken way for purposes of illustration to illustrate the underlying housing wall 1624). FIG. 17 illustrates the internal side of housing wall 1624 having multiple internal ribs 1650 and fastener apertures 1652. In one implementation, housing 1620 comprises a polymeric or plastic housing utilized an electronic device such as a tablet computer, a bottom panel of a keyboard deck, a rear panel of the display and the like. In another implementation, housing 1620 may be metal, such as aluminum.

Nanotube costing 1626 is similar to nanotube costing 1226 described above with respect to FIG. 13. Nanotube costing 1626 is a conformal coating that covers and extends over ribs 1650 follow the contours of ribs 1650. As a result, nanotube coating 1626 does not alter the internal appearance or internal structure. Because nanotube coating 1626 follows the contour shapes of the interior surface of wall 1624, the overall surface area of nanotube coating 1626 is increased, increasing thermal dissipation capacity for coating 1626. In one implementation, nanotube coating 1626 fills in cavities or depressions so as to have regions of increased thickness for selective regions of enhanced or additional thermal transmission. In one implementation, the nanotube coating 66 further coats the interior sides, edges or sidewalls of fastener apertures 1652 as described with respect to nanotube coating 1226 above.

Figure 18:
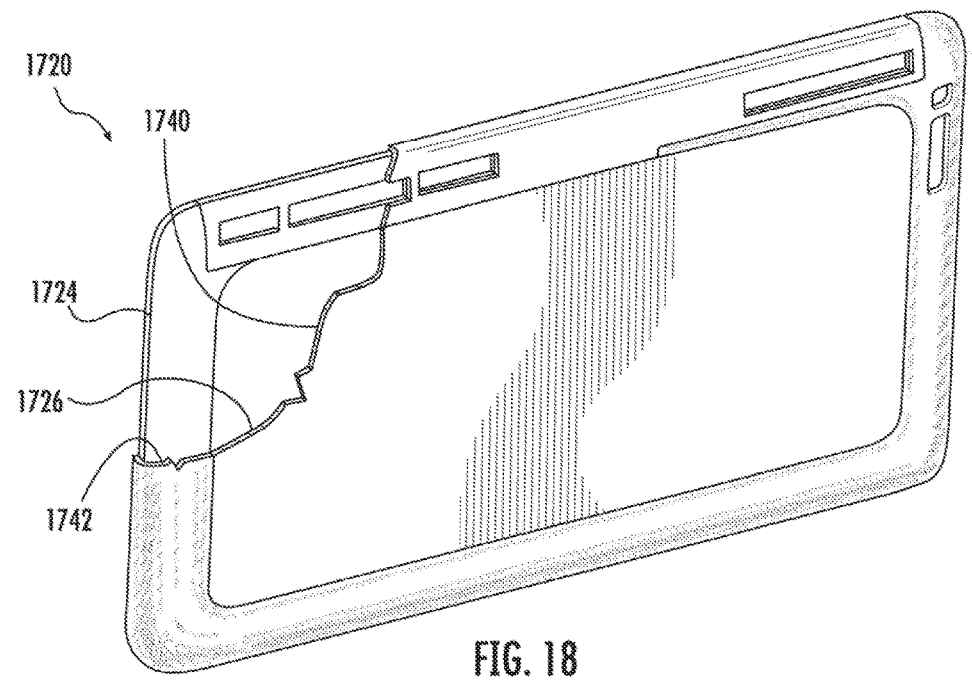
FIG. 18 is a perspective view of another example implementation of electronic device housing of FIG. 1.

FIG. 18 illustrate electronic device housing 1720, another example implementation of electronic device housing 20. Electronic device housing 1720 comprises housing wall 1724 and nanotube coating 1726 (shown broken away for purposes of illustration to illustrate the underlying wall 1724). In the example illustrated, housing wall 1724 comprises the rear panel of electronic device, such as the rear panel of a tablet computer or the rear panel of a display.

Nanotube coating 1726 is a conformal coating that coats the exterior surface of housing wall 1724. In the example illustrated, nanotube coating 1726 comprises two distinctly colored portions 1740 and 1742. As with portions 740, 742 described above with respect to FIG. 8, portion 1740, 1742 have distinct colors. Portion 1740 coats the central external surface of wall 1724 while portion 1742 coats the outer perimeter portions of wall 1724. As a result, nanotube coating 1726 is utilized to provide a selected outer color and finish to the exterior surface of housing 1720. Because coating 1726 conforms to the underlying contours, curvatures and shapes of wall 1724, coating 1726 does not alter the design aesthetics of wall 1724.

Figure 19:
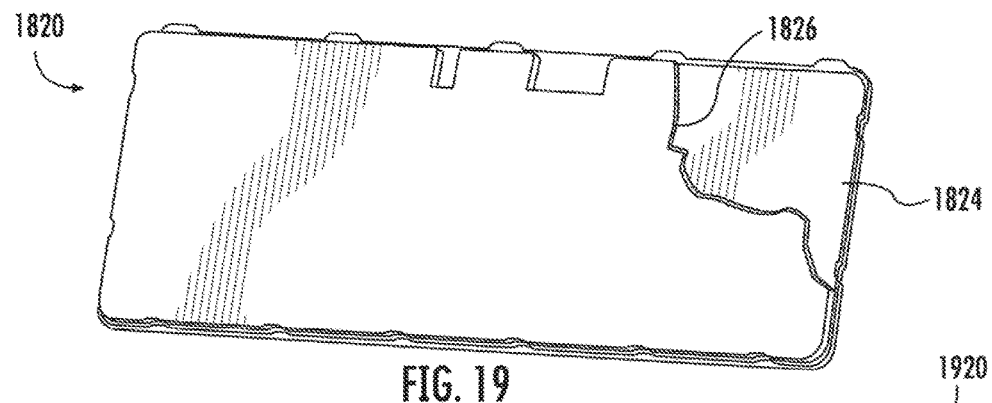
FIG. 19 is a perspective view of another example implementation of electronic device housing of FIG. 1.

FIG. 19 is a perspective view of electronic device housing 1820, another example implementation of electronic device housing 20. Electronic device housing 1820 comprises housing wall 1824 and nanotube coating 1826 (shown brokers away for purposes of illustration to illustrate the underlying wall 1824). In the example illustrated, housing wall 1824 comprises the mar panel of a keyboard (such as a KWERTY keyboard) for insertion into a cavity of a keyboard deck, such as the keyboard deck of a notebook or laptop computer.

Nanotube costing 1826 is a conformal coating that costs the exterior surf ace of housing wall 1824. Because coating 1726 conforms to the underlying contours, curvatures and shapes of wall 1824 and because costing 1826 has a thickness of less than or equal to 0.040 mm, coating 1826 does not interfere with insertion of the keyboard into the cavity of the keyboard deck previously sized and configured for receiving the keyboard without coating 1826. In the example illustrated, nanotube coating 1826 thermally dissipates heat generated from backlighting elements of the keyboard. Although illustrated as uniformly covering the entire backside of wall 1824 of the keyboard, in other implementations, coating 1826 may be patterned upon the back surface of wall 1824 in a fashion similar to that shown in FIG. 10 or FIG. 11 so as to selectively steer heat at a greater transfer rate to corners of wall 1824.

Figure 20:
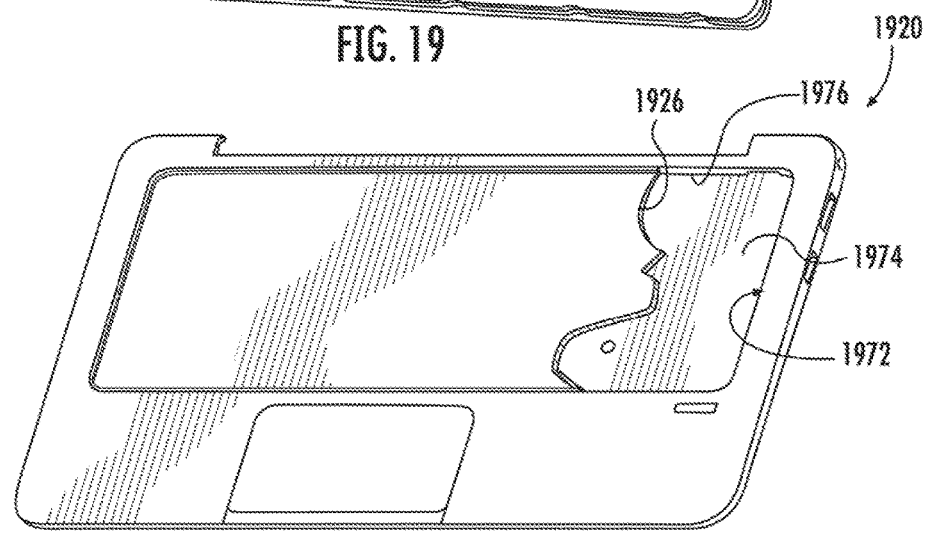
FIG. 20 is a perspective view of another example implementation of electronic device housing of FIG. 1.

FIG. 20 is a perspective view illustrating electronic device housing 1920, another example implementation of electronic device housing 20. Electronic device housing 1920 comprises housing wall 1924 and nanotube coating 1926 (shown broken away for purposes of illustration to illustrate the underlying wall 1924). In the example illustrated, housing wall 1924 comprises the upper panel of a keyboard receiving deck of a notebook or laptop computer. Wall 1924 forms a recess or cavity 1972 for receiving of a keyboard, such as the keyboard partially formed by housing wall 1824 (with or without costing 1826) shown in FIG. 19.

Nanotube coating 1928 is a conformal coating that coats the exterior surface cavity 1972 of housing wall 1924. In the example illustrated, coating 1926 coats and covers both the floor 1974 and the internal side 1976 of the cavity 1972. Because coating 1926 conforms to the underlying contours, curvatures and shapes of wall 1924 and because coating 1926 has a thickness of less than or equal to 0.040 mm, costing 1926 substantially retains the original shape and original depth of cavity 1972, prior to the addition of coating 1926 so as to not interfere with insertion of the keyboard into the cavity 1972 of the keyboard deck previously sized and configured for receiving the keyboard without coating 1926. In the example illustrated, nanotube coating 1926 thermally dissipates heat generated from backlighting elements of the keyboard. Although illustrated as uniformly covering the entire backside of wall 1924 within cavity 1972 of the keyboard, in other implementations, coating 1926 may be patterned upon the interior surfaces of cavity 1972 in a fashion similar to that shown in FIG. 10 or FIG. 11 so as to selectively steer heat at a greater transfer rate to corners of cavity 1972.

Figure 21:
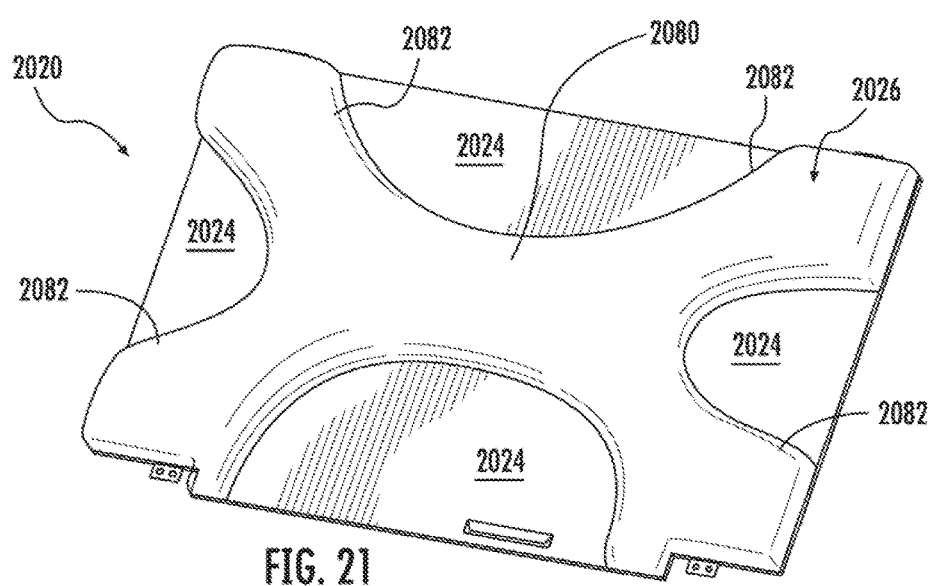
FIG. 21 is a perspective view of another example implementation of electronics device housing of FIG. 1.

FIG. 21 is a perspective view illustrating electronic device housing 2020, another example implementation of electronic device housing 20. Electronic device housing 2020 comprises housing wall 2024 and nanotube coating 2026. In the example illustrated, housing wall 2024 comprises a metal bracket for a display module.

Nanotube coating 2026 is a conformal coating that coats the interior surface of housing wall 2024. In the example illustrated, coating 2026 is patterned upon the interior surface of wall 2024 in a fashion similar to the patterning of coating 926 as shown described above with respect to FIG. 10. As a result, coating 2026 thermally conducts or transmits heat at a greater flow rate away from a central portion of housing wall 2024 towards corners of housing wall 2024. In one implementation, central portion 2080 of coating 2026 extends adjacent to a generating electrical component, such as a video controller for a video display. Extensions 2082 extend outwardly from central portion 2082 the corners of wall 2024. Although exaggerated for purpose of illustration, the thickness of patterned coating 2026 is less than or equal to 0.040 mm. In other implementations, coating 2026 may have a greater thickness, in some implementations, coating 2026 may alternatively patterned onto housing wall 2024 in a fashion similar to coating 1026 or coating 1126 described above with respect to FIGS. 11 and 12.

In each of the above-described examples illustrating various nanotube coatings, the nanotube coatings comprise carbon nanotube coatings having a thickness of less than or equal to 0.040 mm. In other implementations, the above-described nanotube coatings may have other thicknesses and may have alternative compositions. The above-described nanotube coatings facilitate controlled and possibly directed dissipation of heat while not altering the basic structure, weight, or dimensions of the electronic device or the electronic device housing in which the coating is applied. Such nanotube coatings may be applied to existing electron device housings by application method such as spraying, dipping, pad printing, stamping her Inkjet printing. Such nanotube coatings may be applied to housing walls whether such housing walls be metallic, polymeric or ceramic.

What is claimed is:

1. An electronic device housing comprising
an electronic device housing wall with an inner surface and an outer surface, the inner surface comprising pores that do not extend through the housing wall and a rib protruding therefrom;
a first nanotube coating coated upon the outer surface of the housing wall and forming an outermost layer upon the outer surface, the first nanotube coating being a heat dissipation coating; and
a second nanotube coating coated upon the inner surface of the housing wall, the second nanotube coating being a second heat dissipation coating and filling pores of the inner surface to reduce a thermally insulative effect of air within the pores and encapsulating the rib of the inner surface of the housing wall, wherein the second nanotube coating follows a contour of the rib to increase a surface area of the second nanotube coating coated upon the inner surface of the housing wall.

2. The electronic device housing of claim 1, wherein the first nanotube coating has a thickness of less than or equal to 0.040 mm.

3. The electronic device housing of claim 1, wherein the second nanotube coating fills the pores on a first side of the nanotube coating and is smoother on a second side of the nanotube coating as compared to the first side.

4. The electronic device housing of claim 1, wherein the first nanotube coating comprises a first portion having a first thickness and a second portion continuous with the first portion, the second portion having a second thickness greater than the first thickness.

5. The electronic device housing of claim 1, wherein the first nanotube coating has a first portion of a first color and a second portion of a second color.

6. The electronic device housing of claim 1, wherein the wall forms a recess and wherein the first nanotube coating has a first thickness in the recess and a second thickness less than the first thickness outside the recess.

7. The electronic device housing of claim 1, wherein the first, and the second nanotube coatings are applied to selected portions of the wall to steer heat at a greater heat flow rate away from the electrical component towards corners of the housing as compared to a heat flow rate at which heat is steered to other portions of the housing.

8. The electronic device housing of claim 1 comprising a housing selected from a group of housings consisting of: a deck to support a keyboard, the deck comprising the wall which forms the deck receiving cavity, wherein the inner and the outer surfaces form a floor of a keyboard receiving cavity; a keyboard, the wall forming a bottom of the keyboard and the inner and the outer surfaces forming a bottom of the wall; and a display panel housing, the wall forming a back of the display panel housing, the inner and the outer surfaces forming a rear of the wall.

9. The electronic device housing of claim 1, when the wall comprises a polymer.

10. The electronic device housing of claim 1, when the wall comprises a fastener aperture, the second nanotube coating being coated within an interior surface of the fastener aperture.

11. The electronic device housing of claim 1, wherein the second nanotube coating has a thickness of less than or equal to 0.040 mm.

12. The electronic device housing of claim 1, wherein the first nanotube coating is in direct contact with outer surface of the housing wall.

13. The electronic device housing of claim 1, wherein the second nanotube coating is in direct contact with the inner surface of the housing wall.

14. An electronic device housing comprising:
an electronic device housing wall with an inner surface and an outer surface, the outer surface comprising pores that do not extend through the housing wall and the inner surface comprising a rib protruding therefrom;

a first nanotube coating coated upon the outer surface of the housing wall and forming an outermost layer upon the outer surface, the first nanotube coating being a heat dissipation coating and filling pores of the outer surface to reduce a thermally insulative effect of air within the pores;

a second nanotube coating coated upon the inner surface of the housing wall, the second nanotube coating being a second heat dissipation coating and encapsulating the rib of the inner surface of the housing wall, wherein the second nanotube coating follows a contour of the rib to increase a surface area of the second nanotube coating coated upon the inner surface of the housing wall.

* * * * *

UNITED STATES PATENT AND TRADEMARK OFFICE
CERTIFICATE OF CORRECTION

PATENT NO. : 10,444,799 B2  
APPLICATION NO. : 15/021590  
DATED : October 15, 2019  
INVENTOR(S) : Bach Lien Nguyen et al.

Page 1 of 1

It is certified that error appears in the above-identified patent and that said Letters Patent is hereby corrected as shown below:

In the Claims

In Column 12, Line 40, in Claim 8, delete "claim 1" and insert -- claim 1, --, therefor.

Signed and Sealed this  
Fourteenth Day of January, 2020

Andrei Iancu  
*Director of the United States Patent and Trademark Office*